United States Patent [19]

Matsumoto et al.

[11] Patent Number: 4,518,903
[45] Date of Patent: May 21, 1985

[54] DELAYED TURN-OFF CONTROL FOR VEHICLE PUMPING DEVICE

[75] Inventors: Akio Matsumoto; Mitsuyoshi Yokota, both of Himeji, Japan

[73] Assignee: Mitsubishi Denki Kabushiki Kaisha, Tokyo, Japan

[21] Appl. No.: 549,181

[22] Filed: Nov. 4, 1983

[30] Foreign Application Priority Data

Nov. 12, 1982 [JP] Japan ............ 57-171904[U]

[51] Int. Cl.³ .................................. B60T 13/72
[52] U.S. Cl. .................................. 318/481; 318/484; 303/12; 303/20
[58] Field of Search .............. 318/481, 484; 303/10, 303/11, 12, 20

[56] References Cited

U.S. PATENT DOCUMENTS

| | | | |
|---|---|---|---|
| 3,681,671 | 8/1972 | Elliott | 318/481 |
| 3,745,781 | 7/1973 | Rasmussen | 318/484 X |
| 4,000,450 | 12/1976 | Nurnberg | 318/484 X |
| 4,017,778 | 4/1977 | Koch | 318/484 X |
| 4,097,791 | 6/1978 | Bivens et al. | 318/484 |
| 4,200,826 | 4/1980 | Calusio | 318/484 |

OTHER PUBLICATIONS

1982 Oldsmobile Cutlass Ciera and Omega Service Manual, 1981 General Motor Corp., pp. 8A-337, 8A-301, 8A-1, 0.

Primary Examiner—S. J. Witkowski
Assistant Examiner—Bentsu Ro
Attorney, Agent, or Firm—Lowe, King, Price & Becker

[57] ABSTRACT

Disclosed is a control for pumping devices in vehicle application. Upon closure of a brake actuator switch (4) subsequent to actuation of a power switch (6) a power transistor (81) becomes conductive and a DC voltage from batteries (5) is fed to a DC motor (2). The brake actuator switch when brought into an open position permits supply of the DC voltage to the base of the power transistor through a time constant circuit (85, 86) for a limited period of time, so that the power transistor becomes conductive to supply the DC voltage to the DC motor for that period. The DC motor activates a pump (1) which in turn operates a pressure-operating unit (10).

4 Claims, 3 Drawing Figures

DELAYED TURN-OFF CONTROL FOR VEHICLE PUMPING DEVICE

BACKGROUND OF THE INVENTION

1. Field of The Invention

The present invention relates to a control for pumps in vehicle application. More particularly, it relates to an improved control for controlling a vacuum pump for supply of a negative pressure to a force multiplier or a vacuum tank generally included in a braking apparatus for vehicles.

2. Description of the Prior Art

FIG. 1 is an electric circuit diagram showing a conventional control technique for pumps used in vehicles. Referring to FIG. 1, the conventional control will be discussed with respect to its schematic structure. The primary function of a vacuum pump 1 is to supply a negative pressure to a pressure-operating unit 10. A representative pressure-operating unit 10 comprises a force multiplier or a vacuum tank generally included in a vehicle braking apparatus. As is well known in the art, the force multiplier functions to augment the force of stepping when the driver steps on the brake. The vacuum tank is used to store a vacuum pressure set up by the vacuum pump 1. The vacuum pump 1 is driven by a DC motor 2 which, combined with the vacuum pump 1, forms a vehicle pumping device. The DC motor 2 is controlled by a control circuit 3 which includes a power transistor 31 connected in series with the DC motor 2, a driver transistor 32 controlling operation of the power transistor 31, base resistors 33 and 34 for the respective transistors 31 and 32, a surge absorbing diode 35 and a base-emitter resistor 36. The DC motor 2 is fed with a DC voltage from batteries 5 via a power switch 6. A pressure detecting switch 41 is provided in conjunction with a force multiplier or a vacuum tank for detecting a negative pressure generated by the vacuum pump 1 and has a normally closed contact which is open when the negative pressure reaches a predetermined value.

FIG. 2 is a diagram which will give a better understanding of operation of the conventional control as shown in FIG. 1. Operation of the conventional control will be described by reference to FIGS. 1 and 2. Under the condition where the engine has not yet started and the vehicle is at a stop, the negative pressure in the force multiplier or the vacuum tank is generally small and approximately close to the atmospheric pressure. The contact of the pressure detecting switch 41 is therefore in the closed position. Upon closure of the power switch 6 under these circumstances the driver transistor 32 is fed at its base with a low level signal from the pressure detecting switch 41 and rendered nonconductive. Current flows from the batteries into the base of the power transistor 31 through the power switch 6 and the base resistor 33, rendering the power transistor 31 conductive. In response to conduction of the power transistor 31, the DC voltage from the batteries 5 is supplied to the DC motor 2 which in turn rotates to activate the vacuum pump 1.

It is noted that the pressure in the force multiplier or the vacuum tank decreases gradually and the negative pressure increases. If the negative pressure in the force multiplier or the vacuum tank reaches a first predetermined value, then the normally closed contact of the pressure detecting switch 41 is opened. The driver transistor 32 becomes conductive in response to the base current flowing from the batteries 5 through the power switch 6 and the base resistor 34. As a result, the power transistor 31 becomes non-conductive and the DC motor 2 is no longer supplied with the DC voltage so that the vacuum pump 1 comes to a halt. As the negative pressure in the force multiplier or the vacuum tank decreases and drops to a second predetermined value, the contact of the pressure detecting switch 41 is closed again and the DC motor 2 is energized. The above described sequence of operations is repeated in such manner as to keep the negative pressure in the force multiplier or the vacuum tank within the range from the first predetermined value to the second.

However, provided that braking is effected intermittently as seen in FIG. 2(a) in the conventional control, the negative pressure for activating the force multiplier demonstrates a sharp decline as plotted with the solid line in FIG. 2(b). Operation of the force multiplier is less powerful and demands an even greater force of brake stepping. In case of complicated braking operation, the control apparatus has the problem that the DC motor 2 is liable to inch and may enjoy only a very limited length of life.

SUMMARY OF THE INVENTION

Accordingly, a primary object of the present invention is to provide a control for a pumping device used in vehicles which is capable of increasing the pressure in a pressure-operating unit even after actuation of an actuator switch, without possible inching of a DC motor.

Briefly stated, the pumping device embodying the present invention is adapted such that the pump is activated upon driving the DC motor during an actuated state of the actuator switch and then for a predetermined period of time thereafter to thereby enable the pressure-operating unit with an increased pressure therein. The present invention, therefore, provides the capability to increase the pressure in the pressure-operating device without any inching of the DC motor since the DC motor is driven to actuate the pump only for a limited period of time even after completion of actuation of the actuator switch.

In a preferred embodiment of the present invention, switching means is switched to supply a DC voltage to the DC motor upon closure of the actuator switch, which switching means is further switched only for a limited period of time by way of a time constant circuit in response to opening of the actuator switch.

In the preferred embodiment of the present invention, control means may be set up merely by addition of a simple circuit as a switching means or a time constant circuit.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
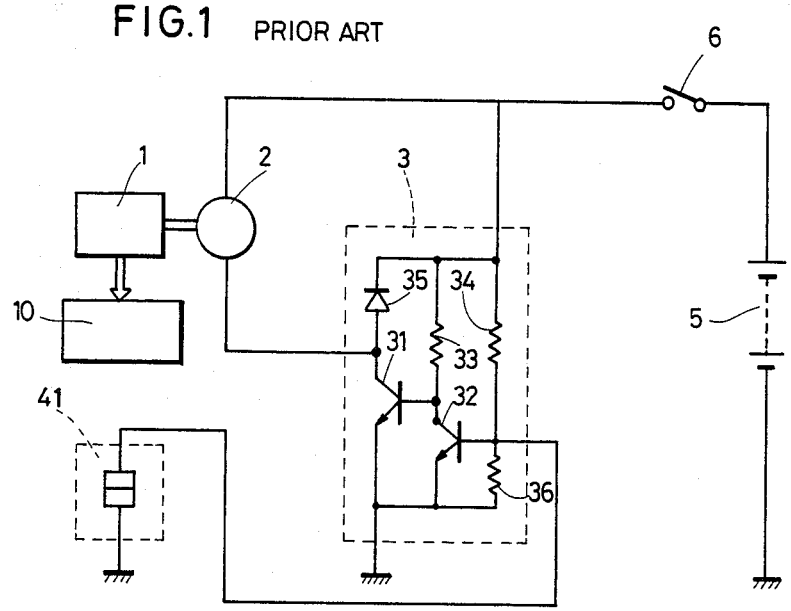
FIG. 1 is an electric circuit diagram of a control scheme in a conventional pumping device in vehicle application.
Figure 2:
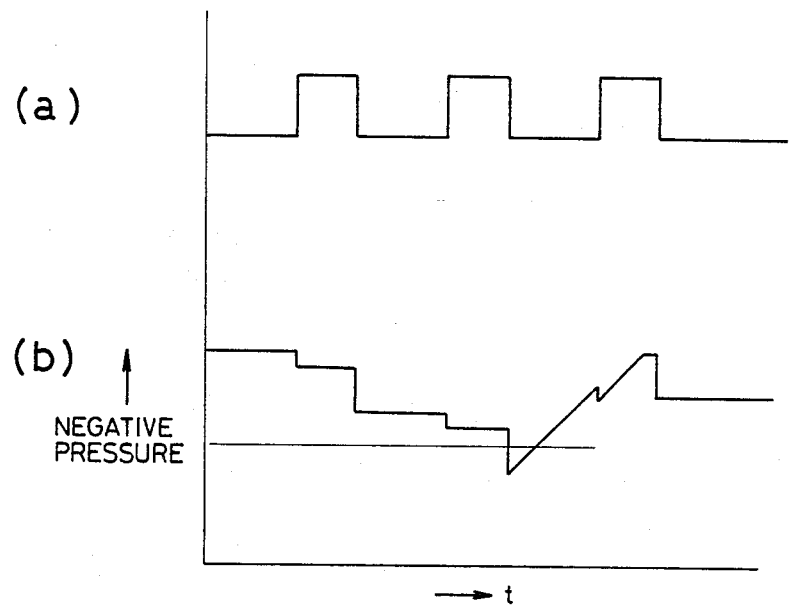
FIG. 2 is a diagram which will give a better understanding of operation of the conventional control as shown in FIG. 1.
Figure 3:
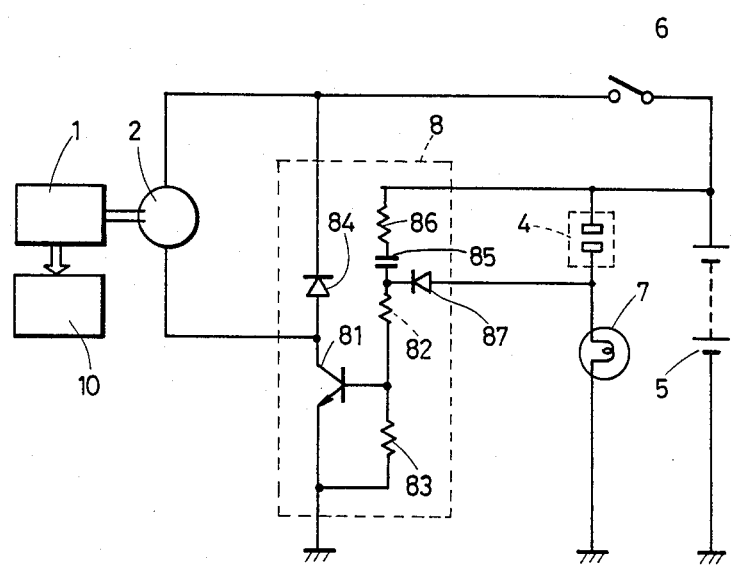
FIG. 3 is an electric circuit diagram of a preferred embodiment of the present invention.

FIG. 3 is an electric circuit diagram of a preferred embodiment of the present invention. The embodiment illustrated in FIG. 3 is similar to the above discussed circuit as shown in FIG. 1 except for provision of a normally open brake actuator switch 4 and the control circuit 8. In other words, the control circuit 8 comprises a power transistor 81, a base resistor 82, a base-emitter resistor 83, a surge absorbing diode 84, a capacitor 85 for setup of a time constant circuit, a current limiting resistor 86 and a reverse blocking diode 87.

If the power switch 6 is thrown in the above circuit arrangement, no base current flows into the power transistor 81 which in turn remains non-conductive and does not drive the DC motor 2. However, provided that braking takes place and the normally open contact of the brake actuator switch 4 closes, base current flows into the power transistor 81 through the reverse blocking diode 87 and the base resistor 82. When this occurs, DC current flows from the DC power supply 5 through the current limiting resistor 86 to charge the capacitor 85. The power transistor 81 becomes conductive upon flowing of the base current thereinto, supplying a DC voltage to the DC motor 2. In response thereto the DC motor 2 starts rotating to activate the vacuum pump 1. Upon activating the vacuum pump 1 the negative pressure in the pressure-operating unit 10 increases.

After completion of braking the normally open contact of the brake actuator switch 4 is opened. The discharging current for the capacitor 85 travels along a circuit including the batteries 5, the current limiting resistor 86, the capacitor 85, the base resistor 82, the base-emitter path of the power transistor 81, the base-emitter resistor 83 and ending with the batteries 5. In response to the discharging current the power transistor 81 remains conductive only for a given period of time as determined by the charging time constant of the capacitor 85 and resistors 86 and 82. This implies that the vacuum pump 1 remains activated and the negative pressure in the pressure-operating unit 10 further increases for the given period of time even after braking has been completed. If the given period of time has passed and the discharging curent for the capacitor 85 decreases below an amplitude of the base current necessary to render the power transistor 81 conductive, the power transistor 81 becomes non-conductive. This shuts off power supply to the DC motor 2 and disables the vacuum pump 1.

In the foregoing embodiment, the power transistor 81 is held conductive only for the time in which the brake switch 4 is closed and a further period of time as determined by the charging time constant of the capacitor 85 after the brake actuator switch 4 has been brought into an open position, so that the DC motor 2 remains activated to assure further enhancement of the pressure in the pressure-operating unit 10.

Whereas in the above disclosure the vacuum pump 1 has particularly been illustrated and described, it is obvious that the present invention is applicable when it is desired to acquire a positive pressure form a compressor.

Furthermore, it is obvious that the actuator switch 4 may be one for enabling and disabling a door assembly, instead of the brake actuator switch used in the foregoing embodiment. In this event the door assembly is the pressure-operating unit operable upon the pressure form the vacuum pump 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a control for a vacuum pump for a vehicle brake, having a power supply, a motor supplied with a voltage from said power supply, said vacuum pump activated by said motor for generating a negative pressure, and a pressure operating unit operable with the pressure from said pump, the improvement comprising:

a brake activated switch means for causing said control to activate said pressure operating unit for a time period coincident with an activated state of said switch means, said control including circuit means responsive to said switch means for connecting said power supply to said motor, delay means for causing said control to maintain said pressure operating unit active for a predetermined time period after termination of said activated state of said switch means, said delay means comprising power supply correcting means responsive to deactivation of said switch means upon termination of said activated state thereof for connecting said power supply to said motor for said predetermined time period subsequent to deactivation of said switch means.

2. The improved control recited in claim 1 wherein said control comprises transistor means in series connection with said motor and said power supply, said switch means connected in series between said power supply and said transistor means, and further comprising circuitry connected to said transistor means, said connecting means of said delay means being series connected between said switch means and said transistor means and being connected to be bypassed by said brake activated switch means, said switch means and said connecting means providing current to said transistor means in nonoverlapping time periods.

3. In a control for a pumping device for use in a vehicle having a power supply, a motor supplied with a voltage from said power supply, a pumping device for use in the vehicle, including a pump activated by said motor for generating a pressure, and a pressure operating unit operable with the pressure from said pump, the improvement comprising:

first means for causing said control to activate said pressure operating unit for a time period in which a condition responsive switching means is in an activated state, and second means for causing said control to maintain said pressure operating unit active for a predetermined time period after said activated state of said switching means terminates, said first means comprising circuit means responsive to said activated state of said switching means for connecting said power supply to said motor, said second means comprising capacitance means responsive to deactivation of said switching means upon termination of said activated state thereof for connecting said power supply to said motor for said predetermined time period subsequent to deactivation of said switching means, said control comprising transistor means in series connection with said motor and said power supply, said switching means comprising a condition responsive switch connected in series between said power supply and said transistor means, said first means comprising circuitry connecting said condition responsive switch to said transistor means, said capacitance means of said second means being series connected between said first means and said transistor means and being connected to be bypassed by said condition responsive switch, said condition responsive switch and said capacitance means providing current to said transistor means in nonoverlapping time periods.

4. The improved control recited in claim 3 wherein said condition responsive switch comprises normally open contacts connected by a diode to said transistor means, and said capacitance means is charged during a time period wherein said contacts are open the charging current for said capacitance flowing in series with said transistor.

* * * * *